United States Patent
Thompson et al.

(10) Patent No.: US 11,095,135 B2
(45) Date of Patent: Aug. 17, 2021

(54) INFORMATION HANDLING SYSTEM BATTERY CHARGE MANAGEMENT IN A DYNAMIC DISCHARGE ENVIRONMENT

(71) Applicant: Dell Products L.P., Round Rock, TX (US)

(72) Inventors: Richard Christopher Thompson, Cedar Park, TX (US); Yan Ning, Cedar Park, TX (US); Chia-Liang Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 16/170,430

(22) Filed: Oct. 25, 2018

(65) Prior Publication Data

US 2020/0136401 A1    Apr. 30, 2020

(51) Int. Cl.
*G06F 1/26* (2006.01)
*G06F 1/28* (2006.01)
*H02J 7/00* (2006.01)
*G06F 1/16* (2006.01)

(52) U.S. Cl.
CPC .......... *H02J 7/0026* (2013.01); *G06F 1/1635* (2013.01); *G06F 1/263* (2013.01); *G06F 1/28* (2013.01); *H02J 7/007* (2013.01)

(58) Field of Classification Search
None
See application file for complete search history.

(56) References Cited

U.S. PATENT DOCUMENTS

| | | | |
|---|---|---|---|
| 7,017,061 B2 | 3/2006 | Lippert et al. | |
| 8,742,722 B2 | 6/2014 | Chang | |
| 9,509,164 B2 | 11/2016 | Groat et al. | |
| 9,559,543 B2* | 1/2017 | Greening | H02J 7/0077 |
| 2011/0298429 A1* | 12/2011 | Chiu | H02J 7/0072 320/162 |
| 2013/0038297 A1* | 2/2013 | Sang | H02J 7/0068 320/145 |
| 2017/0182907 A1* | 6/2017 | Ikeda | B60L 50/10 |

* cited by examiner

*Primary Examiner* — Fahmida Rahman
(74) *Attorney, Agent, or Firm* — Zagorin Cave LLP; Robert W. Holland

(57) ABSTRACT

Dynamic battery discharge at an information handling system during battery charge, such as to support increased power use associated with processor turbo mode, is managed by setting a reduced maximum charge current dynamically during constant voltage charging so that battery voltage droop from discharge does not result in command of an excessive charge current after the discharge.

19 Claims, 5 Drawing Sheets

INFORMATION HANDLING SYSTEM BATTERY CHARGE MANAGEMENT IN A DYNAMIC DISCHARGE ENVIRONMENT

BACKGROUND OF THE INVENTION

Field of the Invention

The present invention relates in general to the field of information handling system battery management, and more particularly to an information handling system battery charge management in a dynamic discharge environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically integrate a battery to power processing components when external power is not available, such as a lithium ion battery. Generally, when external power is available, current from external power is provided to a charger that allocates available external power to run processing components and directs excess external power to charge the battery. Batteries generally charge with a constant current set at a maximum value until the battery approaches a full voltage level, then batteries charge at a constant voltage with current decreasing over time as the battery charge nears completion. Battery charge is typically performed by logic of a charger that tracks voltage and current levels of the battery. In addition, batteries often include battery management units (BMU) and protection circuits that monitor for overcurrent and/or overvoltage conditions. For instance, a BMU interacts with the charger to manage a battery with standardized commands, such as the 0x14 command for a value for maximum requested current. Failure to maintain battery charging within current and voltage constraints will result in faster battery degradation and pouch swelling, and can also cause overheating and permanent failure if overcurrent, overvoltage or over temperature protection circuits are triggered.

Processing components, such as central processing units, can have wide variations in current draw during normal operations based upon workload. For example, CPUs often include turbo modes that will kick in during periods of heavy workload to rapidly perform processing functions with a corresponding increase in current draw. Generally, information handling system power supplies adapt to such variations in current draw so that voltages at the processing components do not droop, such as by including capacitance that feeds additional current during periods of heavy workload. However, as processing components have increased in capability, the highest current draws can exceed the capability of external power supplies to provide sufficient current. External power supplies generally convert alternating current from a wall socket into direct current that is provided through a cable to a port of the information handling system. Many smaller portable information handling systems use a USB Type C port to accept power with a 100 W maximum limit, even though the processing components have the ability to draw greater than 100 W under normal operating conditions. One option is to include a dedicated power port that accepts an external power supply having an output of equal or greater than the maximum power draw of the processing components, however, a dedicated power port tends to increase housing size and system cost.

Another option that supports the use of smaller power supplies having less power output than an information handling system can consume is to simultaneously supply power from both the external power supply and an integrated battery. Essentially, the battery steps in to discharge current when the external power supply cannot fully meet the current draw of the processing components. For example, Intel has introduced Dynamic Battery Peak Power (DBPT) to its processors to support power draw from a battery when the processor exceeds power output available from an external power supply. For example, during turbo modes of processor operation, the battery discharges to ensure adequate current is available while the external power supply supports system operation without battery discharge when turbo modes are not in use. By discharging the battery only during peak power use that exceeds external power supply output, a battery may be maintained at a full charge to provide a maximum battery life when the external power source disconnects.

SUMMARY OF THE INVENTION

Therefore, a need has arisen for a system and method which manages information handling system battery charge in a dynamic discharge environment.

In accordance with the present invention, a system and method are provided which substantially reduce the disadvantages and problems associated with previous methods and systems for charging a battery. Maximum charging current to a battery dynamically-adjusts downward during taper charging so that temporary battery voltage drops related to dynamic discharges will not lead to application of excessive charging current and an over voltage condition at the battery after the dynamic discharge completes.

More specifically, an information handling system processes information with a processor supported by a chipset to use a turbo mode having increased power consumption. A power supply provides regulated power to the processor and meets increased power draw in turbo mode by applying current from an external power source and a battery discharge. A charger charges the battery with external power available from the external power source when the system load allows for excess external power to charge the battery. In a constant current charge mode, a maximum charge current is applied to the battery. At a predetermined battery voltage, the charger enters a constant voltage charge mode having a charging current that tapers as the battery charge state increases. The charger tracks current applied to charge the battery in the constant voltage charging mode and applies the historical applied current to dynamically-adjust downward the maximum charging current of the charger to the battery as the battery charge state increases. If a dynamic battery discharge occurs during constant voltage battery charging, such as to support a processor turbo mode, an increase in charging current commanded due to a drop in battery voltage will be limited by the dynamically-adjusted charging current for at least a predetermined time. In one example embodiment, a dynamic maximum charging threshold is set based upon charging current at a last charge increment. In another embodiment, a dynamic maximum charging threshold is set based upon an estimated taper charge current. In the event that a prolonged battery discharge results in a reduced battery charge state, charging at a constant current maximum charge may be initiated.

The present invention provides a number of important technical advantages. One example of an important technical advantage is that an information handling system battery charge is managed in a dynamic discharge environment to maintain a full battery charge without exceeding voltage and current limits of the battery. During constant voltage charging modes of the battery, charge current is limited below the maximum charge current, such as the charge current used during the constant current charging mode, so that transient voltage drops related to battery discharge under a dynamic discharge load will not produce a spike in charge current after the discharge load ends. In one example embodiment, 10 msec turbo pulse discharges from a battery to power a CPU created a voltage overshoot at the battery during constant current charging using conventional charging logic but did not interfere with a trickle charge of the battery using the dynamic maximum charging current as set forth herein. More effective management of battery voltage and current limits improves battery life and maintains the battery in a fully charged state for better charge life in operational conditions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system battery dynamic discharge during a charge mode approaching full charge, such as constant voltage charge mode, is managed by capping maximum current for charging the battery during a predetermined time period. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
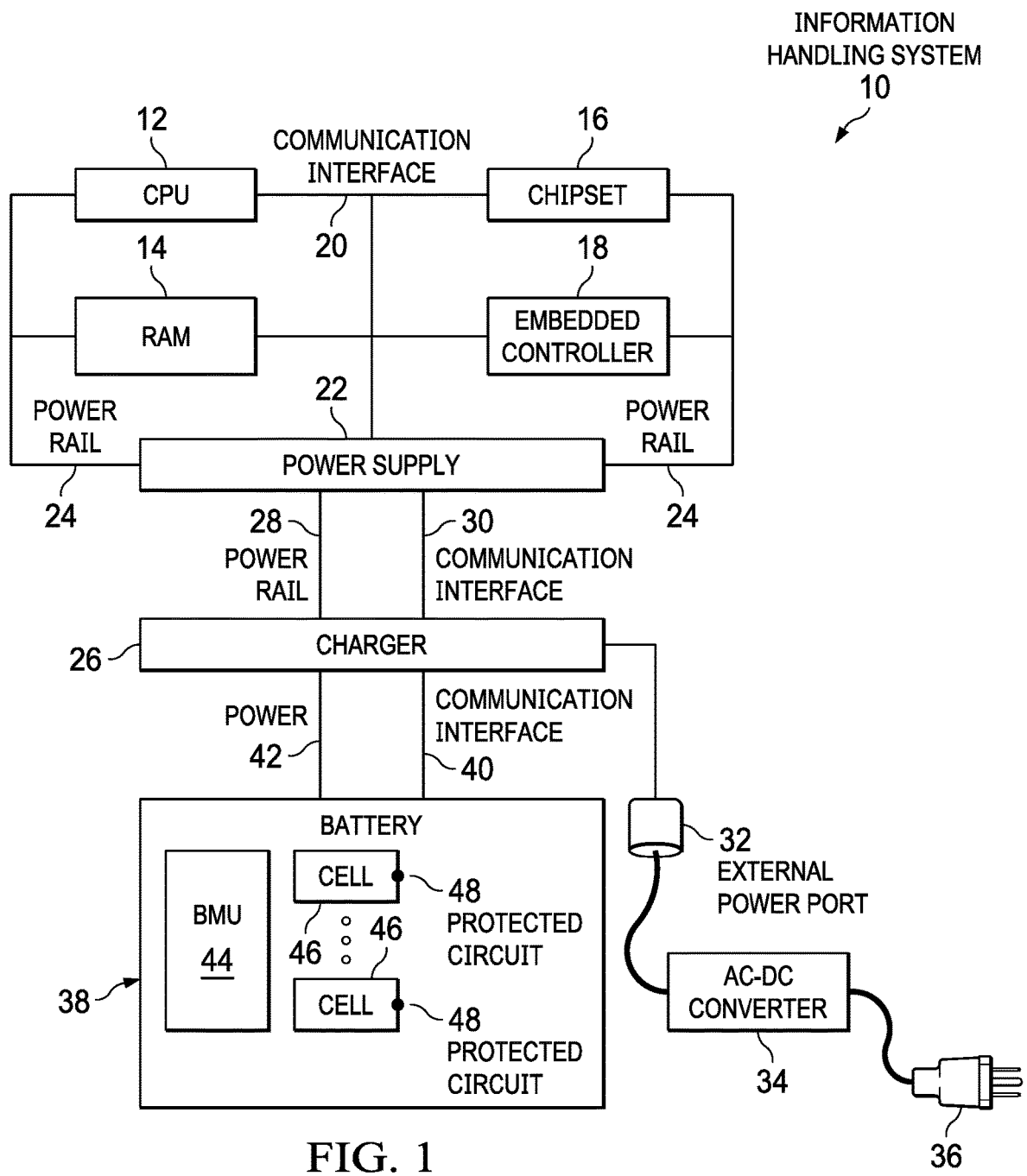
FIG. 1 depicts a block diagram of an information handling system configured to dynamically discharge a battery during a charge.

Referring now to FIG. 1, a block diagram depicts an information handling system configured to dynamically discharge a battery during a charge. In the example embodiment, a central processing unit (CPU) 12 executes instructions to process information, such as instructions of an operating system or application. Random access memory (RAM) 14 stores the instructions and information, such as after retrieval from persistent storage of a hard disk drive or solid state drive. A chipset 16 interfaces with CPU 12 to manage CPU operations, such as clock speed and power consumption. As an example, chipset 16 is an Intel Platform Controller Hub (PCH) that supports a processer turbo mode having increased clock speed and power consumption. An embedded controller 18 interfaces with CPU 12 and chipset 16 to coordinate power use and interactions with other physical components, such as networking, peripheral interfaces, etc. . . . A communication interface 20 provides communication between CPU 12, RAM 14, chipset 16 and embedded controller 18, and may include a variety of communications links, such as PCI, PCI Express, I2C, SMBus and other wirelines and pins interfaced through a motherboard. In various embodiments, information handling system 10 may include a variety of other hardware components, such as networking components, graphics components, an integrated display, etc. . . .

In the example embodiment, information handling system 10 includes a power supply 22 that provides regulated power to processing components through one or more power rails 24. Power supply 22 maintains voltage on power rails 24 to within defined constraints for the processing components by adjusting current to the processing components as power demands shift. In various embodiments, one or more power supplies may feed current to different power rails that meet the constraints of different processing components, such as different rails that have different voltages. Those of skill in the art will recognize that circuits having capacitance and other current regulating components will meet specific design constraints, such as the widely varied power consumption needs of CPU 12 that sometimes performs heavy processing tasks between periods of relatively little use. As an example, chipset 16 may interface with power supply 22 to communicate expected CPU processing bursts, such as when CPU 12 enters a turbo boost mode. Generally, proper operation of processing components calls for regulated voltage levels with varying current by information handling system power supplies 22.

In the example embodiment, a charger 26 interfaces with power supply 22 through a power rail 28 and communication interface 30 to provide power from an external power port 32 and/or a battery 38. During normal operations, charger 26 accepts power from an external power source, such as an AC-DC converter 34 and alternating current source 36, and provides the external power to power supply 22 to power processing components of information handling system 10. Charger 26 uses excess power that is not drawn by power supply 22 to charge battery 38 through a power interface 42 supported by a communication interface 40. For example, battery 38 includes a battery management unit (BMU) 44 that manages charge and discharge of individual battery cells 46, such as by metering current to battery cells 46. For instance, BMU 44 includes a processor having a 0x14 command that sets a maximum charge current. In various embodiments, battery cells 46 are lithium ion battery cells with a nominal voltage of 3.7V that are coupled in series to operate at multiples of the nominal voltage. In the one embodiment, battery charge and protection are managed as a battery pack with individual battery cells 46 having charge parameters monitored by BMU 44 and battery protection enforced by isolating the battery pack in the event of a failure. In an alternative embodiment, each battery cell 46 has a protection circuit 48 that automatically disconnects the battery cell 46 in the event of a battery over voltage or over current event. As an example, battery 38 includes eight cells 46 configured in series and parallel to operate at a nominal native voltage of 14.8V, and AC-DC converter 34 provides current to charger 26 at the nominal native voltage so that charger 26 directs power to battery 38 at the nominal native voltage when excess power is available based upon power supply 22 draw.

During battery 38 charge, charger 26 applies a constant current charge mode followed by a constant voltage charge mode based upon a maximum voltage of the battery in a fully charged state. As an example, a lithium ion battery cell has a maximum voltage of approximately 4.4V and will discharge to below 3.3V. In the constant current charging mode, the battery cell receives a defined maximum charging current, such as 3.2 A of current, which causes the battery cell voltage to increase as the battery cell charge state increases. Once the battery cell reaches the maximum voltage, such as 4.4V, charger 26 enters a constant voltage charge mode that seeks to maintain the maximum voltage by tapering the amount of current sent to the battery cell gradually to a minimum charge current threshold as the battery charge state increases. For instance, current tapers to a low value of 5% of nominal charge current and then stops. Although the terms constant voltage and constant current imply hard current and voltage levels, some variation is expected in voltage and current as battery charge transitions from a maximum current charge value to a tapered charge that maintains a constant voltage. For example, some voltage increase may occur as current tapers towards the full charge state with voltage controlled to a measured maximum value that is maintained having the actual cell voltage (OCV) rising as charge current drops. Generally, battery charge mode changes from constant current to constant voltage mode at approximately 80% of battery full charge. As another example, the amount of current may also vary based upon the amount of excess power available to charge battery 38 while power supply 22 draws power to operate the processing components. For instance, during a constant current charge mode, charge current to battery 38 may drop below the maximum charge current during heavy power draw by power supply 22 and then increase back to maximum charge current as power consumption of processing components decreases.

In the example embodiment, when CPU 12 initiates turbo mode with its associated increase in clock speed and current draw, external power port 32 cannot draw adequate power for power supply 22 to maintain voltage constraints of CPU 12 at the increased current draw. For instance, external power port 32 is a USB Type C port that has a 100 W power limit, which is less than the maximum power draw of power supply 22. As another example, AC-DC converter 34 lacks power conversion sufficient to fully supply power supply 22 during peak power consumption. In order to operate the processing components during peak power draw, power supply 22 simultaneously draws power from both external power port 32 and battery 38, such as with Dynamic Battery Peak Power (DBPT). For example, when power supply 22 draws the maximum power available for external power port 32, battery 38 is allowed to discharge so that the combined power available from battery 38 and external power port 32 will meet the power demands of power supply 22. In one example embodiment, chipset 16 provides a signal to charger 26 and/or power supply 22 to indicate that turbo mode is active.

Figure 2:
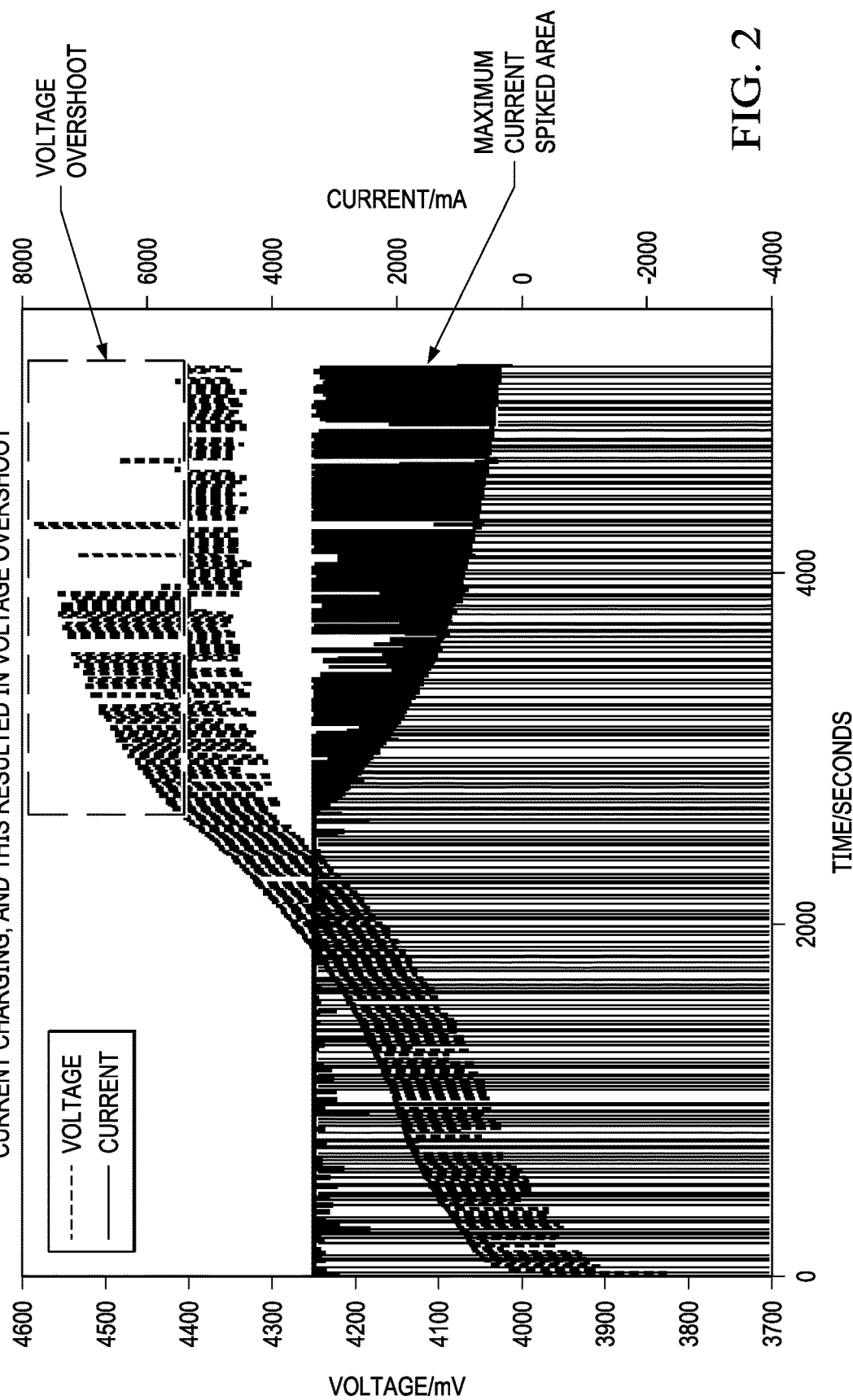
FIG. 2 depicts a graph of current and voltage at a battery over time where a battery over voltage and current spike occurs during charging.

Referring now to FIG. 2, a graph depicts current and voltage at a battery over time where a battery over voltage and maximum current spike occurs during charging. In the example, at time zero a constant current battery charge is initiated with a simulated 10 msec turbo processor discharge pulse applied. During the constant current charging mode, a maximum current of approximately 3.2 A is applied to the battery with an initial voltage of 3.85V. The turbo discharge pulses of approximately 4 A causes battery voltage to drop during each pulse by approximately 0.1V. Once the battery reaches a voltage of approximately 4.4V, the charger changes to a constant voltage charging mode that seeks to taper charging current as the battery charge state increases. The turbo discharge pulse in the constant voltage charging mode causes battery voltage to temporarily drop to about 4.3V resulting in a rapid increase in demand for charging current to maintain the desired 4.4V constant voltage value. The rapid increase in charging current demand is met by completion of the turbo discharge providing additional charger current capacity so that a charge current spike of as much as 3.2 A, the maximum charge current of constant current charging mode, pulses battery voltage to 4.6V, which can trigger an over voltage protection circuit that disconnects the battery. Essentially, battery voltage levels respond too slowly to an increase in charge current so that the charger places the battery in an over voltage condition before reducing charge current to a tapered value. FIG. 2 depicts how repeated maximum current spikes and voltage overshoots follow dynamic battery discharges so that, even if battery protection is not implicated, battery charge parameters exceeded desired values and impact battery reliability and life over time.

To prevent a battery over voltage and/or charge current spike event during constant voltage charging, charger 26 applies a dynamic maximum charge current setting in conjunction with dynamic battery discharge, such as to support a turbo processor mode. For instance, in the example embodiment, charge current maximum during constant current charging is set at approximately 3.2 A. Once charger 26 detects that charging has transitioned from the constant current mode to a constant voltage mode, charger 26 dynamically adjusts the maximum charge current downwards so that temporary voltage drops due to turbo discharges will not result in a charge current spike and associated battery over voltage condition. That is, with a battery near full charge, battery charge control loop is forced to control repeatedly to prevent an overvoltage condition associated with maximum current spikes. The dynamic maximum current reductions may be managed in a variety of ways. In one example embodiment, charger 26 dynamically sets a maximum charge current and prohibits anything greater than the maximum charge current from proceeding to the battery for a predetermined amount of time. In another embodiment, BMU 44 decreases the maximum charge current setting through 0x14 command so that BMU 44 will not accept any greater amount of current until the maximum current setting is changed. The maximum current may be decreased based upon a dynamic charge current that estimates a maximum charging current for the battery's charge state or may be incremented from an actual charge current that last applied before a dynamic battery discharge took place.

In one example embodiment, charger 26 detects a constant voltage charging mode and, in response, measures battery voltage at time increments to adjust charging current so that battery voltage remains constant. Charger 26 stores the charging current for each time increment over a predetermined number of increments and uses the stored charging current values to determine a dynamic maximum charging current. For instance, charging current may be set at a value no greater than that of an immediately previous time increment so that in the constant voltage charging mode the maximum charging current does not increase. Alternatively, the charging current is set at no greater than the value at an immediately previous time increment plus an additional charging current incremental increase so that charging current incrementally increases over time until the charging current matches that associated with the measured voltage. In one embodiment, charger 26 receives notice from chipset 16 when a turbo mode is active so that charge currents during a dynamic discharge that supports a turbo processor operation are constrained by a dynamic maximum charge current. In another embodiment, charger 26 may track battery voltages and/or commanded charging currents instead of actual charging current to estimate a maximum charging current value to dynamically set during a constant voltage charging mode. The algorithm selected for a charger 26 and battery 38 may vary based upon expected dynamic battery discharge patterns and available charging capacity relative to peak power consumption.

Figure 3:
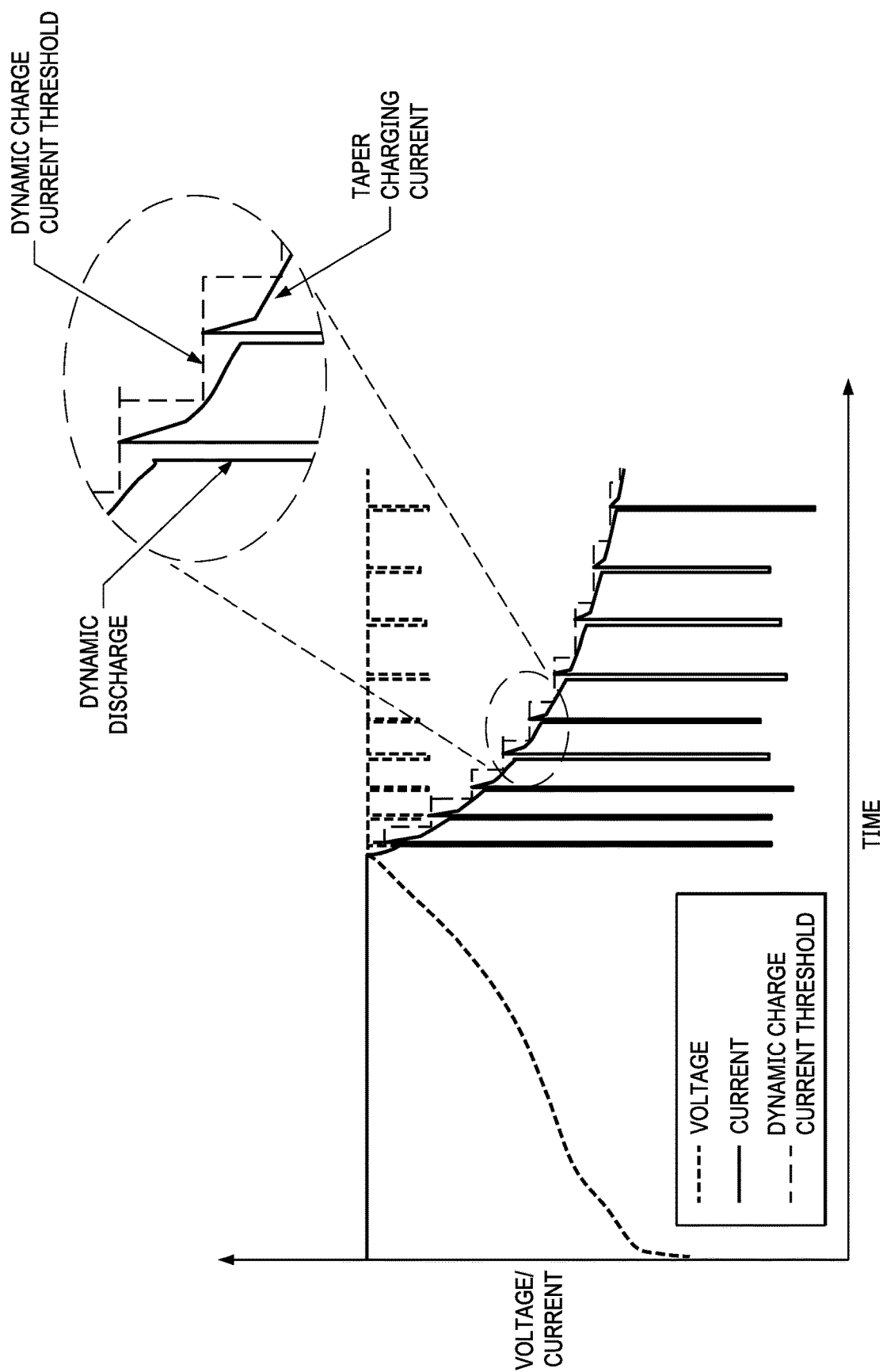
FIG. 3 depicts a graph of current and voltage at a battery over time where a battery maximum current spiked area and over voltage events are avoided by dynamic maximum charger current adjustments.

Referring now to FIG. 3, a graph depicts current and voltage at a battery over time where a battery maximum current spiked area and over voltage shoot events are avoided by dynamic maximum charger current adjustments. In the example embodiment, the battery and charging conditions depicted by FIG. 2 are recreated with charger 26 programmed to enforce dynamic charge current threshold increments that set a maximum charge current to apply to a battery in a constant voltage charge mode. During the initial charge, a constant maximum current of approximately 3.2 A is applied to charge battery 38 until the constant voltage charge level is reached. Once the constant voltage charge mode starts, charge current steps downward as battery 38 charge state increases so that voltage remains at the constant voltage level. In the blown up detail of the constant voltage mode charging current 52, at the completion of each turbo discharge from the battery a slight current peak is depicted that remains below the stairs step level 50 that defines the dynamic charge current threshold increments 50. For example, the dynamic charge current maximum is set at each time increment as the actual charge current applied at that time increment plus an increment charge increase. As long as the charge commanded by the charger does not exceed the dynamically-decreasing maximum current, the charge commanded by the charger is applied to charge the battery. If, however, the charge commanded by the charger exceeds the dynamically-decreasing charge maximum, then the charge applied by the charger to the battery is decreased to the dynamically-decreasing maximum charge. In an embodiment that uses a dynamic charge current where an estimated taper charge is set as the maximum, a similar pattern may occur depending upon the estimate of charging current applied.

In the example embodiment depicted by FIG. 3, charger 26 applies a dynamic charge current threshold (DCCT) to prevent taper charging current in the constant voltage charge mode from exceeding a dynamically-adjusted maximum charge current according to the formula:

$$DCCT_{(n+1)}=[\text{Taper Charging Current}]_n+\text{Delta}, n=0,1,2,\ldots$$

Where $DCCT_1=[\text{Taper Charging Current}]_0=$the charging current from the last constant current charge step. Under this formula if a gauge calculated $[\text{Taper Charging Current}]_{(n+1)}$ is greater than $DCCT_{(n+1)}$, then $[\text{Taper Charging Current}]_{(n+1)}$ is set equal to $DCCT_{(n+1)}$. Delta is set at zero or a small incremental value that permits a gradual increase in the charging maximum current over time. The result is that the maximum charging current set at 3.2 A upon transition to constant voltage charging mode will dynamically step downwards as battery charge state increases by ignoring measured voltages dropped due to dynamic discharge from the battery. As an alternative, a dynamic charge current (DCC) may be defined by estimating how the maximum charging current will decrease over time. For example, a dynamically-adjusted charge current is set according to the formula:

$$DCC_{(n+1)}=DCC_n-\text{Delta}, n=0,1,2\ldots$$

Where $DCC_n$ is the charge current from the last constant current charging step and Delta is a small positive value. In the event that a discharge from the battery occurs during the constant voltage charging mode, the charging current will not exceed the DCCT threshold or will be set at the DCC value so that battery voltage will not experience an over voltage condition. This essentially removes the need for an over voltage protection circuit to operate to prevent the over voltage state. That is, where conventional over voltage response speed is insufficient, the DCCT and DCC settings prevent over voltage by delaying charging current step increases. As described above, the dynamically-adjusted maximum charge current can be implemented on charger 26 or BMU 44.

Figure 4:
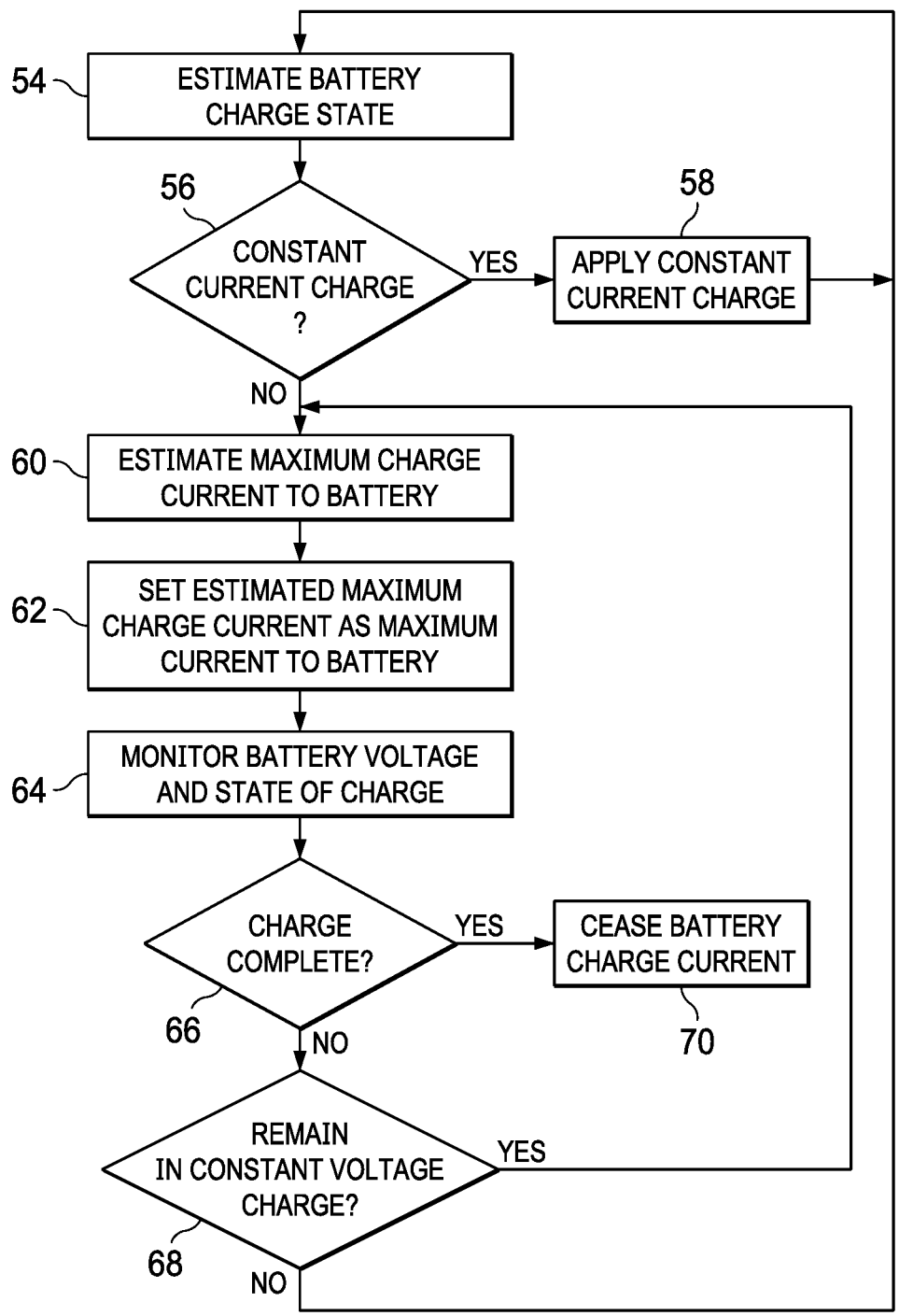
FIG. 4 depicts a flow diagram of a process for dynamically-adjusting a maximum charge current in a constant voltage charging mode based upon an estimated battery charge state.

Referring now to FIG. 4, a flow diagram depicts a process for dynamically-adjusting a maximum charge current in a constant voltage charging mode. The process starts at step 54 on system power up with an estimate of battery charge state, such as by measuring battery voltage when not discharging. At step 56, based upon the measured battery voltage a determination is made of whether the battery should charge in constant current or constant voltage mode. If in constant current charging mode, the process continues to step 58 to charge with a maximum current defined by the constant current charge mode. At step 56, once a constant voltage charge mode is determined, the process continues to step 60 to estimate a maximum charge current to the battery, such as based upon a battery voltage measured when the battery is not discharging. At step 62, the estimated maximum charge current is set as the maximum allowed charging current to the battery. The maximum current dynamically adjusts downward over time based upon previous charging current applied to the battery in the absence of a discharge. For example, a timer in the charger may be used to increment the maximum charging current downward at predetermined times based upon an estimated charge rate for actual charging current. The downward increment of maximum charging current may vary based upon the amount of current supplied for charging. For example, if a heavy load at the power supply limits charging current to the battery below requested charging current, a smaller incremental decrease may be used.

At step 64, the battery voltage and state of charge is measured and monitored so that increases in battery state of charge at the constant voltage charging mode decreases the charging current in a conventional manner with a corresponding decrease in the maximum charging current. Similarly, at step 64 unexpected decreases in battery voltage may indicate insufficient battery charge current, such as if frequent pulse discharges from the battery due to processor turbo mode operations result in a decreased battery charge state. At step 66, if the charge is not complete, the process continues to step 68 to determine if the charge mode should remain in the constant voltage mode. If so the process returns to step 60 to continue charging with a dynamically-adjusted maximum current based upon estimated charge. If at step 68 the battery voltage indicates a need for constant current charging, such as when battery voltage remains below the constant voltage charging voltage level for a predetermined time, the process returns to step 54 to initiate constant current charging at the constant current maximum charge level. If at step 66 a determination is made that the battery charge has completed, the process ends at step 70 by ceasing the battery charge current.

Figure 5:
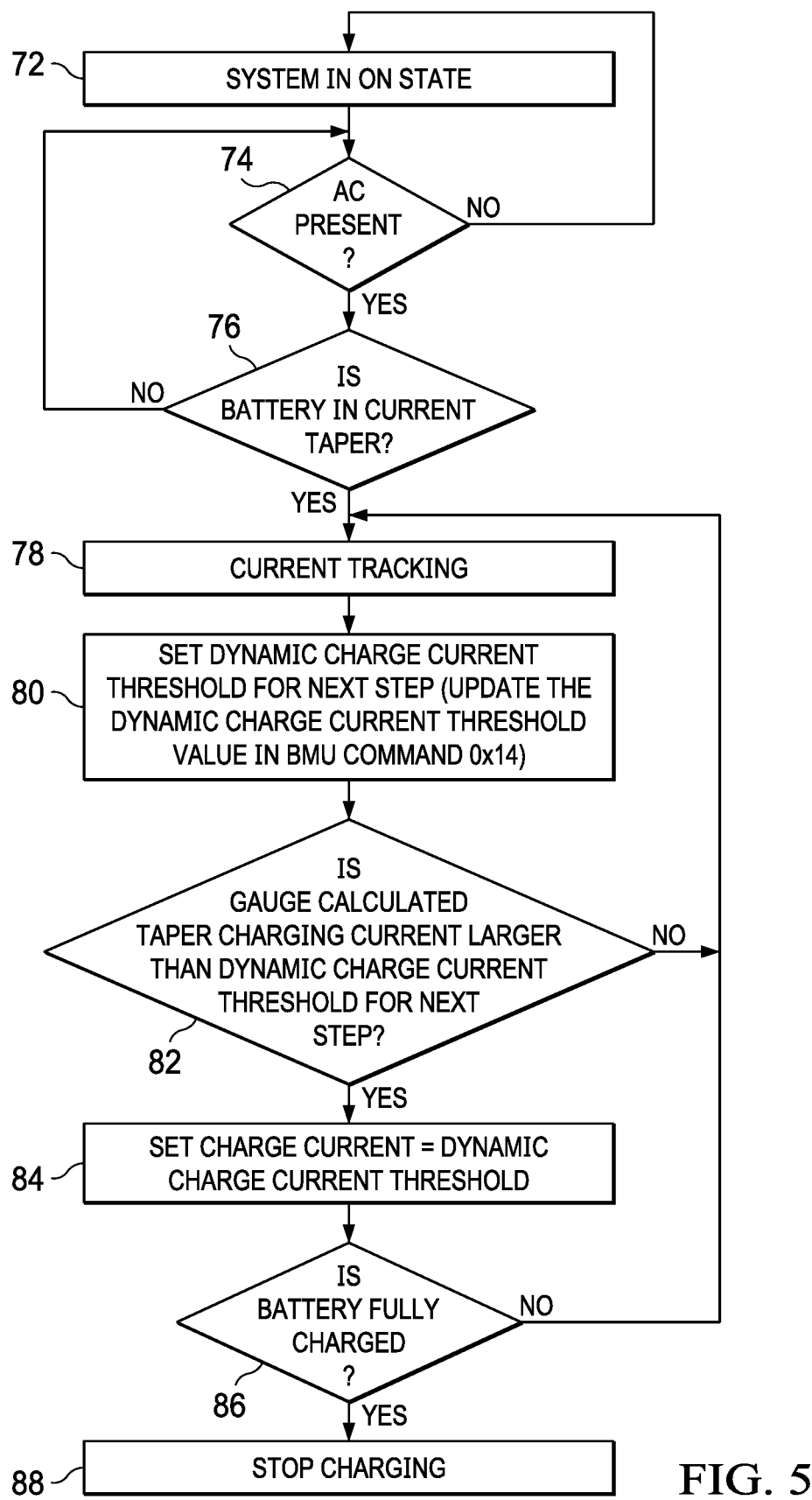
FIG. 5 depicts a flow diagram of a process for dynamically-adjusting a maximum charge current in a constant voltage charging mode based upon an actual battery charge.

Referring now to FIG. 5, a flow diagram depicts a process for dynamically-adjusting a maximum charge current in a constant voltage charging mode based upon an actual battery charge. The process starts at step 72 with the information handling system placed in an on state. At step 74 a determination is made of whether external power is available, such as with an alternating current AC-DC converter plugged into a power port of the system. If not, the system returns to step 72 to continue operating on battery power. If external power is available, the process continues to step 76 to determine if the battery is charging with current tapering in the constant voltage charging mode. If not, the process returns to step 74 to continue charging in the constant current charging mode. If the battery is charging with current tapering, the process continues to step 78 to tracking charging current, such as by storing actual charging current in the absence of a battery discharge at predetermined time increments. At step 80, a DCCT threshold is set for the next charger current setting increment and updated to the battery BMU using the 0x14 command. For instance, the DCCT threshold is set as an incremental increase over the actual charge most recently set for the battery measured voltage in the absence of a discharge. At step 82, a gauge calculated taper charging current, such as a charging current determined from measured battery voltage, is compared against the DCCT maximum charging current threshold. If the commanded charging current is less than or equal to the threshold, the process returns to step 78 to continue tracking charging current. If at step 82 the commanded charging current exceeds the DCCT maximum charging current, the process continues to step 84 to set the charging current at the DCCT threshold maximum charging current. At step 86 a determination is made of whether the battery is fully charged and, if not, the process returns to step 78 to track charging current. If at step 86 the battery is fully charged, the process ends at step 88 by ceasing battery charging.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor operable to execute instructions that process information;
one or more power rails interfaced with the processor to supply power to the processor at a predetermined voltage;
a power supply interfaced with the one or more power rails to provide the predetermined voltage;
an external power port integrated in the housing and operable to accept external power from an external power source;
a battery integrated in the housing and operable to store power; and
a charger interfaced with the external power port and the battery, the charger providing power to the power supply, the charger receiving power from the external power port to charge the battery in one of a constant current charge mode or a constant voltage charge mode;
wherein the power supply selectively provides power to the one or more power rails from just the battery, just the external power port or both the battery and the external power port; and
wherein the charger when in the constant voltage charge mode dynamically reduces a maximum current to charge the battery in time increments based upon a battery charge state and charges the battery at the maximum current for that time increment, the charger in response to a subsequent decreased battery charge state limiting actual charge current to the battery based upon the lowest maximum current of the previous two or more time increments.

2. The information handling system of claim 1 wherein the charger determines the maximum current based upon a voltage measured at the battery at time increments and the charger limits actual current to the battery to an actual current to the battery at a most recent previous time increment.

3. The information handling system of claim 1 wherein the charger determines the maximum current based upon a voltage measured at the battery at time increments and the charger limits actual current to the battery to an actual current at a most recent time increment plus a predetermined incremental current.

4. The information handling system of claim 1 further comprising a battery management unit interfaced with the battery and controlling current provided to the battery from the charger, the battery management unit interfaced with the charger, the charger communicating the value of maximum current to the battery management unit, the battery management unit providing no more than the maximum current to the battery.

5. The information handling system of claim 1 wherein the battery comprises plural battery cells managed by a battery management unit.

6. The information handling system of claim 1 wherein the external power port comprises a USB Type C port.

7. The information handling system of claim 1 wherein the processor has a turbo mode associated with increased current draw.

8. The information handling system of claim 1 wherein the charger determines the maximum current based upon a voltage measured at the battery at time increments, the charger storing the maximum current for each time increment for a predetermined time, and the charger limits actual current to the battery to the lowest of the stored maximum currents.

9. A method for managing an information handling system battery charge, the method comprising:
charging a battery with a current;
determining a maximum current to charge the battery at a plurality of time increments;
comparing the maximum current determined at each present time increment with a maximum current determined at one or more previous time increments;
detecting that the maximum current of the one or more previous time increments is less than the maximum current determined at a present time increment; and
responsive to the detecting that the maximum current of the one or more previous time increments is less than the maximum current determined at the present time increment, charging the battery with the current based upon the lowest maximum current of the previous two or more time increments.

10. The method of claim 9 wherein the charging the battery based upon the lowest maximum current of the previous two or more time increments further comprises:
determining an actual current applied to charge the battery at the time increment of the lowest maximum current; and
setting current to charge the battery as a function of the actual current.

11. The method of claim 10 wherein the function of the actual current comprises an incremental increase of the actual current.

12. The method of claim 10 wherein the function of the actual current comprises an incremental decrease of the actual current.

13. The method of claim 9 wherein the charging the battery based upon the lowest maximum current of the previous two or more time increments further comprises:
setting the charge current to the lowest maximum current of the previous two or more time increments; and
applying current to the battery based upon current available to charge the battery, the applied current not exceeding the set lowest maximum current.

14. The method of claim 9 further comprising:
determining that the maximum current determined at each present time increment equals a constant current value for a predetermined number of time increments; and
in response, configuring charge in a constant current mode.

15. A method for charging a battery, the method comprising:
detecting the battery has a voltage below a predetermined voltage;
charging the battery in a constant current mode based on the battery having below the predetermined voltage, the constant current mode applying a charging current of not greater than a maximum current;
subsequent to the charging in the constant current mode, detecting the battery has at least the predetermined voltage;
charging the battery in a constant voltage mode based on the battery having at least the predetermined voltage, the constant voltage mode applying a charging current of less than the maximum current, the applied current determined from a measured voltage of the battery;
while in the constant voltage mode, tracking the applied current over time;
while in the constant voltage mode, detecting a decrease in the measured voltage of the battery that determines an increase in the applied current; and
while in the constant voltage mode, in response to the detecting the decrease in the measured voltage of the battery that determines an increase in the applied current, adjusting the increase in the applied current according to a comparison of two or more previously applied charging currents.

16. The method of claim 15 further comprising:
determining the applied current from the measured voltage of the battery at time increments;
wherein adjusting the increase in the applied current according to the comparison of two or more previously applied charging currents further comprises maintaining the applied current at the applied current determined from a previous time increment.

17. The method of claim 16 further comprising incrementing the applied current by a predetermined amount for each subsequent time interval having a determined increase in the applied current based upon the decrease in the measured voltage.

18. The method of claim 17 further comprising:
detecting for a predetermined number of time increments a determined increase in the applied current based upon the decrease in the measured voltage; and
in response to the detecting, commanding a constant current mode to charge the battery.

19. The method of claim 15 further comprising discharging from the battery during the constant voltage mode, the discharging decreasing the measured voltage of the battery.

* * * * *